United States Patent
Ananthanarayanan et al.

(10) Patent No.: US 8,265,641 B2
(45) Date of Patent: Sep. 11, 2012

(54) WIRELESS COMMUNICATION DEVICE CONFIGURED TO ENTER AN ACTIVE STATE BASED UPON A DETECTION OF A POTENTIAL REQUEST FOR COMMUNICATION SESSION RESOURCES

(75) Inventors: Arulmozhi K. Ananthanarayanan, San Diego, CA (US); Ashu Razdan, San Diego, CA (US); Biren R. Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 563 days.

(21) Appl. No.: 12/465,517

(22) Filed: May 13, 2009

(65) Prior Publication Data
US 2009/0312029 A1 Dec. 17, 2009

Related U.S. Application Data

(60) Provisional application No. 61/061,587, filed on Jun. 13, 2008.

(51) Int. Cl.
*H04W 72/00* (2009.01)
(52) U.S. Cl. ......................................... 455/450
(58) Field of Classification Search .......... 455/517–519, 455/450–454
See application file for complete search history.

(56) References Cited

U.S. PATENT DOCUMENTS

2004/0121791 A1* 6/2004 May et al. ................. 455/519
2004/0266468 A1 12/2004 Brown et al.

FOREIGN PATENT DOCUMENTS

WO 2006055172 5/2006
WO 2007101043 9/2007

OTHER PUBLICATIONS

International Search Report, PCT/US2009/044523, International Searching Authority, European Patent Office, Oct. 1, 2009.
Written Opinion, PCT/US2009/044523, International Searching Authority, European Patent Office, Oct. 1, 2009.

* cited by examiner

*Primary Examiner* — Steven Lim
(74) *Attorney, Agent, or Firm* — Raphael Freiwirth

(57) ABSTRACT

Embodiments are directed to determining whether one or more physical user interactions are present, at a wireless communication device, that indicate a near-future potential communication session resource request. Before the determination, a communication interface of the device is in a dormant state characterized by the device not being permitted to engage in a communication session with a wireless communication network. The device transitions the communication interface, after the determination, from the dormant state to an active state. In the active state, the device performs one or more actions to reduce a delay associated with a transmission of the potential communication session resource request in the event that the potential communication session resource request is actually transmitted by the device. For example, in the active state, the device can power-up or wake-up a radio bearer or modem to reduce a delay before transmission of the potential communication session resource request.

39 Claims, 5 Drawing Sheets

WIRELESS COMMUNICATION DEVICE CONFIGURED TO ENTER AN ACTIVE STATE BASED UPON A DETECTION OF A POTENTIAL REQUEST FOR COMMUNICATION SESSION RESOURCES

CLAIM OF PRIORITY UNDER 35 U.S.C. §119

The present Application for Patent claims priority to Provisional Application No. 61/061,587, entitled "Wireless communication device having communication resource allocation based upon imminent request for a communication channel", filed Jun. 13, 2008, which is assigned to the assignee hereof and hereby expressly incorporated by reference herein in its entirety.

BACKGROUND OF THE INVENTION

1. Field of the Invention

Embodiments are directed to a wireless communication device that is configured to enter an active state based upon a detection of a physical user interaction indicating a near-future potential request for communication session resources.

2. Description of the Related Art

In modern wireless communication devices, a user interacts with various user interfaces of the device to request that a communication channel be opened so that the user can communicate to one or more other communication devices. Physical user interfaces, such as a key pad or push-to-talk (PTT) button, allow the user to dial in information or select information from a graphic user interface (GUI), such as the input of a phone number or selection of a another device from an appropriate screen, and the device will open a communication channel and signal to the intended communication device.

The wireless communication device includes several components that control the opening and maintenance of a communication channel, and these components typically sit in an inactive state on the device so as to conserve power during idle periods. Thus, when the user requests to communicate, the communication components are powered on and then the communication channel is opened (and/or resources are requested). However, this set up time for the components transition to the active state delays the actual opening of the communication channel. In an application that is very time-sensitive to the communication channel setup, such as a PTT communication request, this delay can be noticeable and can impede the immediacy required for the communication.

Some existing communication devices have attempted to alleviate this problem by anticipating that the user is going to request to communicate and preemptively opening a communication channel even though the user has not expressly issued a channel request. For example, one existing communication device is configured to open a communication channel upon the user opening the "address book" application resident on the communication device without the user actually having requested to communicate with a device shown in the address book. This anticipatory communication channel opening can be problematic, however, in that resources are requested and allocated from the wireless communication network, yet the user might not request a communication channel, potentially wasting the resources of both the device and the wireless communication network.

SUMMARY

Embodiments are directed to determining whether one or more physical user interactions are present, at a wireless communication device, that indicate a near-future potential communication session resource request. Before the determination, a communication interface of the device is in a dormant state characterized by the device not being permitted to engage in a communication session with a wireless communication network. The device transitions the communication interface, after the determination, from the dormant state to an active state. In the active state, the device performs one or more actions to reduce a delay associated with a transmission of the potential communication session resource request in the event that the potential communication session resource request is actually transmitted by the device. For example, in the active state, the device can power-up or wake-up a radio bearer or modem to reduce a delay before transmission of the potential communication session resource request.

DETAILED DESCRIPTION

Figure 1:
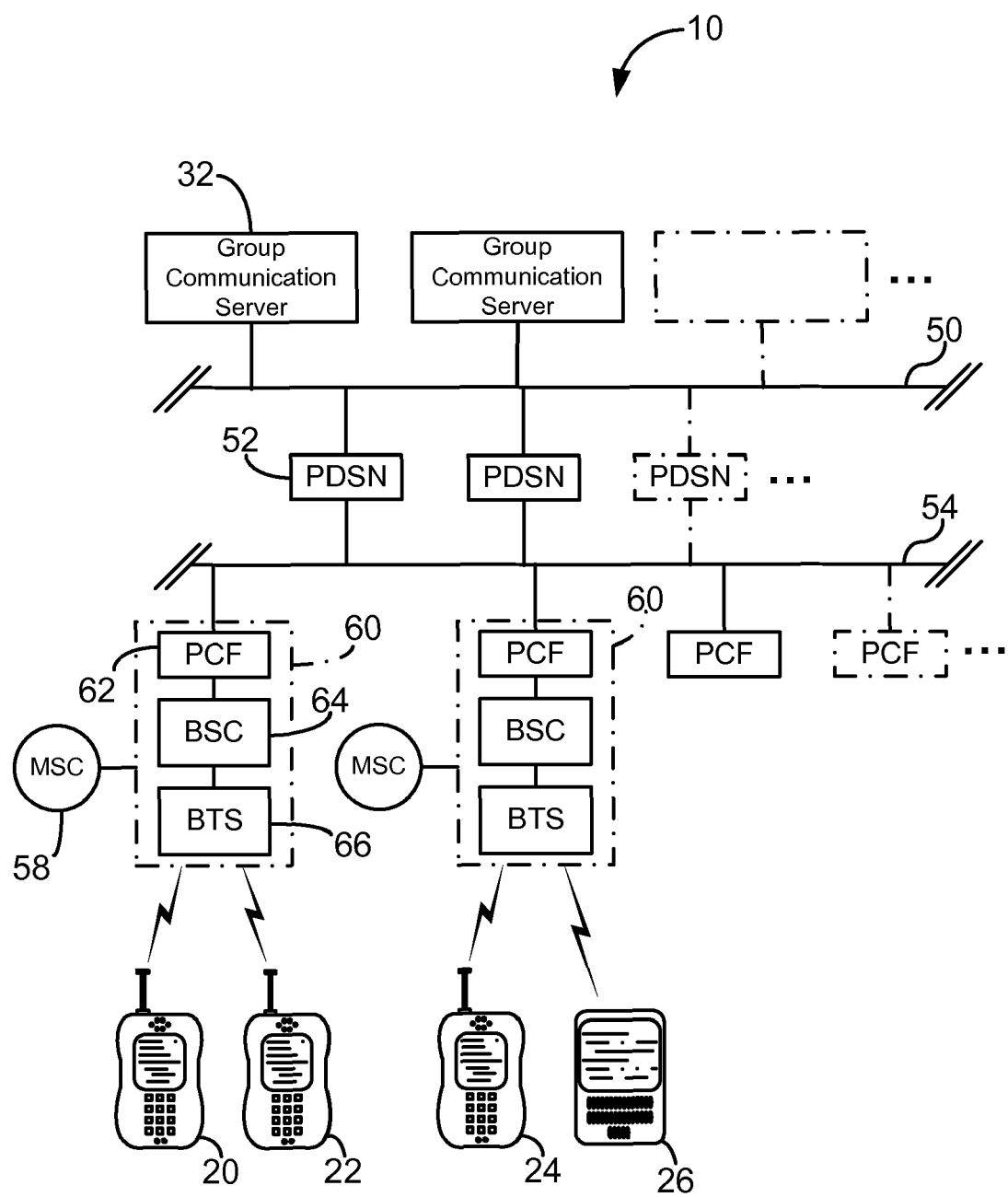
FIG. 1 is a representative diagram of one embodiment of a wireless network in a common cellular telecommunication configuration, having a group communication server control communications between the wireless telecommunication devices of PTT group members.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward and/or reverse traffic channel.

Further, in this description, the terms "communication device," "wireless device," "wireless communications device," "PTT communication device," "handheld device," "mobile device," "access terminal" and/or "handset" are used interchangeably. The terms "call" and "communication" are also used interchangeably, and can be used to refer to a call between two or more parties, or alternatively to a data transport session that may not correspond to a call between two or more parties. The term "application" as used herein is intended to encompass executable and non-executable software files, raw data, aggregated data, patches, and other code segments. All methods of interaction between applications are intended to be encompassed herein, to include all forms of invocation, execution, calling, and data exchanging. Further, like numerals refer to like elements throughout the several views, unless otherwise specified in the description.

With reference to the figures in which like numerals represent like elements throughout, FIG. 1 is a representative diagram of one embodiment of a system 10 with a wireless communication network in a common cellular telecommunication configuration, with communications occurring between the wireless communication devices 20,22,24,26. The system 10 here also includes a series of group communication computer devices (group communication servers) 32 that support a PTT system. The wireless network is merely exemplary and can include any system whereby remote modules communicate over-the-air between and among each other and/or between and among components of a wireless network, including, without limitation, wireless network carriers and/or servers. A series of group communication servers 32 are shown here as connected to a group communication server LAN 50, but other computer devices can be accessible to the LAN 50 to provide functionality to any component on the network. Wireless communication devices 20,22,24,26 can request packet data sessions from the group communication server(s) 32 using a data service option.

The back-office computer devices, such as the group communication server(s) 32, are connected to a wireless service provider's packet data service node (PDSN) such as PDSN 52, shown here resident on a carrier network 54. Each PDSN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 30 communicates with the MSC 32 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 20,22,24,26, by short messaging service ("SMS"), or other over-the-air methods known in the art. It should also be noted that carrier boundaries and/or PTT operator network boundaries do not inhibit or prohibit the sharing of data as described herein.

Cellular telephones and mobile telecommunication devices, such as wireless telephone (74 in FIG. 2), are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 74, can download many types of applications, such as web pages, applets, MIDlets, games and data. In wireless devices that have designated a communication group, the wireless communication device can directly connect with the other member of the set and engage in voice and data communication. However, all such direct communications will occur through, or at the control of, the group communication computer server(s) 32. All data packets of the devices do not necessarily have to travel through the group communication computer device 32 itself, but the group communication computer device 32 is able to ultimately control the communication. Thus, group communication sessions within the system 10 may herein be referred to as server-arbitrated group communication sessions, as conventionally group communication computer device 32 is the server-side 30 component that is aware of and/or can retrieve the identity of the members of the communication group, or direct the identity of the members of a communication group to another computer device. It should be appreciated that the number of computer components resident on server-side LAN 50, or across the wireless network, or Internet generally, are not limited.

In addition to voice communications between the wireless communication devices, other media can be sent such as graphic media, to include pictures in JPEG, TIF, and the like, audio files such as MP3, MP4, WAV, and the like. The media can also be streaming media, such as a multimedia application (e.g., Powerpoint, MOV file, and the like). The group-directed media can also be streaming media, or an interactive session on another computer device on the wireless communication network, such as a hosted game or private bulletin board. Also, for PTT and/or push-to-transfer (PTX) communications, the group-directed communication could be half-duplex audio and/or video conferencing among members of the communication group in substantial real-time, or in delay.

Figure 2:
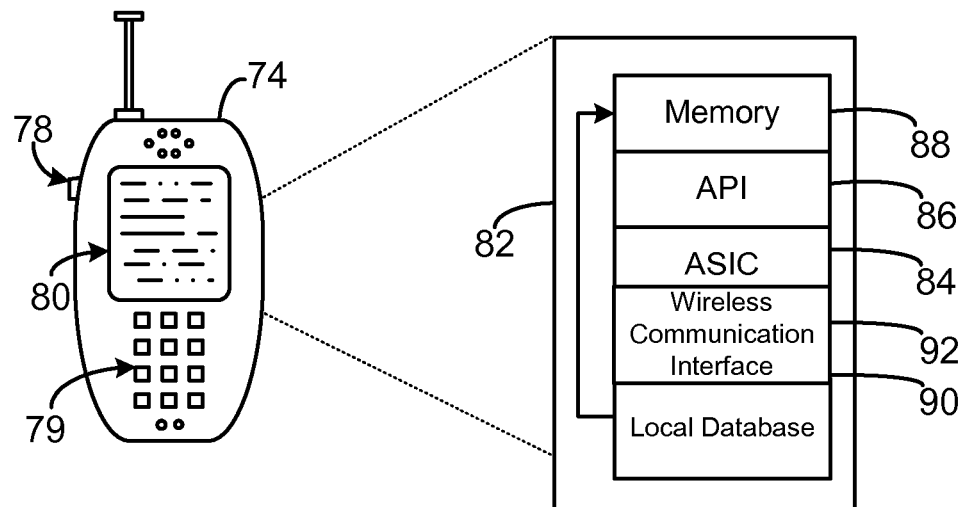
FIG. 2 is a block diagram illustrating the computer platform of the wireless telecommunication device, shown here with a PTT capability and a PTT activation button.

FIG. 2 is a block diagram illustrating one embodiment of the wireless telecommunication device being a mobile telephone 74 embodied with a PTT button 78 that opens the direct communication to a target set of devices, i.e. other members of the communication group. One button press can request the opening of a communication channel, or can bring up a PTT menu or other command tree, as more particularly shown in FIG. 5. The wireless device 14 is also shown as having a graphics display 80 to the user of the wireless device 14. The wireless device 14 includes a computer platform 82 that can handle voice and data packets, and receive and execute software applications transmitted across the wireless network to include the group-directed media. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW®) software developed by QUALCOMM® for wireless device platforms.

As shown here, the wireless device can be a mobile telephone 74, with a graphics display 80, but can also be any wireless device with a computer platform 82 as known in the art, such as a mobile device 26, or even a separate computer platform 82 that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk. The graphics display 80 can present not only information about the ongoing group call, but also the information on the group-directed media, to include a file preview as is more fully described herein.

In this embodiment of the wireless device, the computer platform 82 also includes a direct communication interface 92 (e.g., a radio bearer) that can open the direct communication channel from the wireless device. The direct communication interface 92 can also be part of the standard communication interface for the wireless device which ordinarily carries the voice and data transmitted to and from the wireless device. The direct communication interface 92 typically is comprised of hardware as is known in the art.

Figure 3:
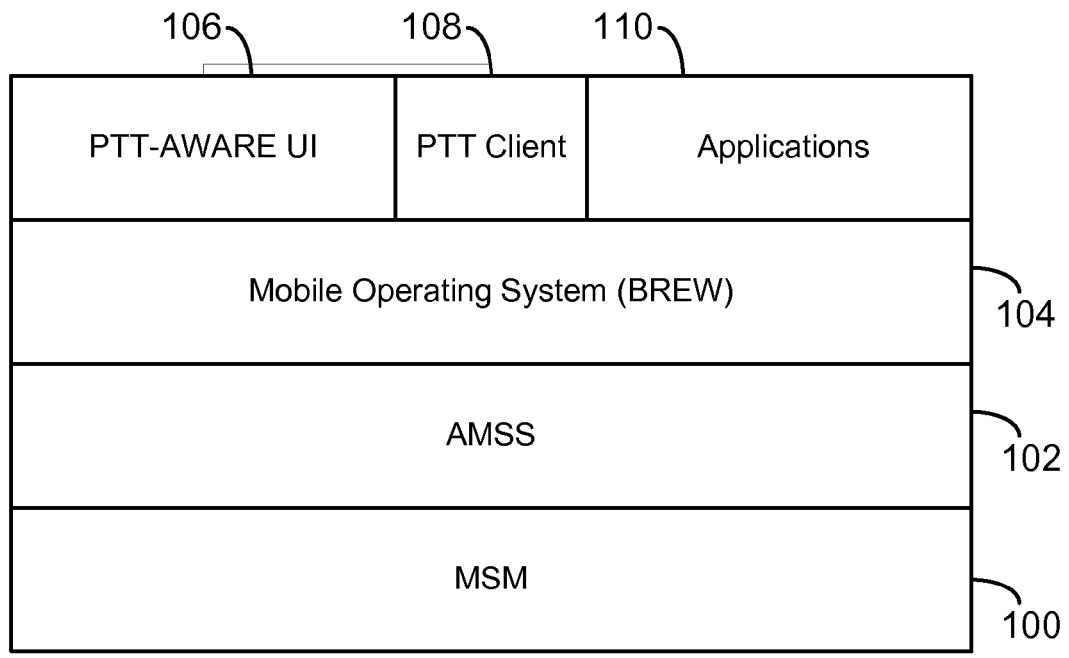
FIG. 3 is a block diagram of one embodiment of the various software layers resident on the computer platform of the wireless communication device.

FIG. 3 is a diagram of one embodiment of the software layers resident on the computer platform 82 of the wireless communication device 74, with a PTT facility and a group-directed communication facility. In this embodiment, the computer platform 82 in the mobile device environment consists of a series of software "layers" developed on top of the Mobile Station Modem (MSM) 100 and the Advanced Mobile Subscriber Software (AMSS) 102, developed by QUALCOMM®, drives the underlying MSM chipset and implements the software protocol stack for the entire suite of CDMA communication technologies that include CDMA2000 1X and CDMA2000 1xEV-DO. There is a mobile operating system layer 104, which in this embodiment is BREW®, also developed by QUALCOMM. The mobile operating system layer 104 application programming interfaces for chip- or device-specific operations, while providing an isolation layer that eliminates direct contact to the AMSS 100 and any OEM software on the computer platform. The mobile operating system layer 104 enables application development that uses mobile device features without having to rewrite the application each time a new release of the device-specific software is released.

The PTT Client 108 is an application that offers access to PTT services through an external interface, here shown at a PTT-aware UI 106. The PTT Client includes all the functions required to enable mobile operating system 104 applications, such as the other resident applications 110. In addition to providing access to PTT services with the PTT Client 108, the PTT Client 108 can act as an isolation layer between all PTT-aware applications and the interface to the group communication computer device 102. In this embodiment, the PTT Client 108 maintains access to PTT services, responds to group communication requests, processes all PTT-aware mobile operating system applications requests for PTT services, processes all outgoing PTT requests, collects and packages vocoder packets for originating PTT talk spurts, and parses packets of vocoder data for terminated PTT talk spurts.

In one embodiment, a handler will provide direct access to the external communication interface, or here, an AMSS 102 interface. The media handler responds to PTT requests for group-directed services by invoking the appropriate APIs, such as those from other resident applications 110, and can service the requests from the user and informs the user the result of any group-directed media request. The handler can be invoked to have the AMSS 102 interface brought to an active state and ready to broadcast on the network, as is more fully described herein. Thus, the AMSS 102 or other communication interface typically has a dormant state and active state such that resources are only requested from the wireless communication network in the active state of the communication interface, e.g. the device components are powered-up and ready to transmit.

Figure 4A:
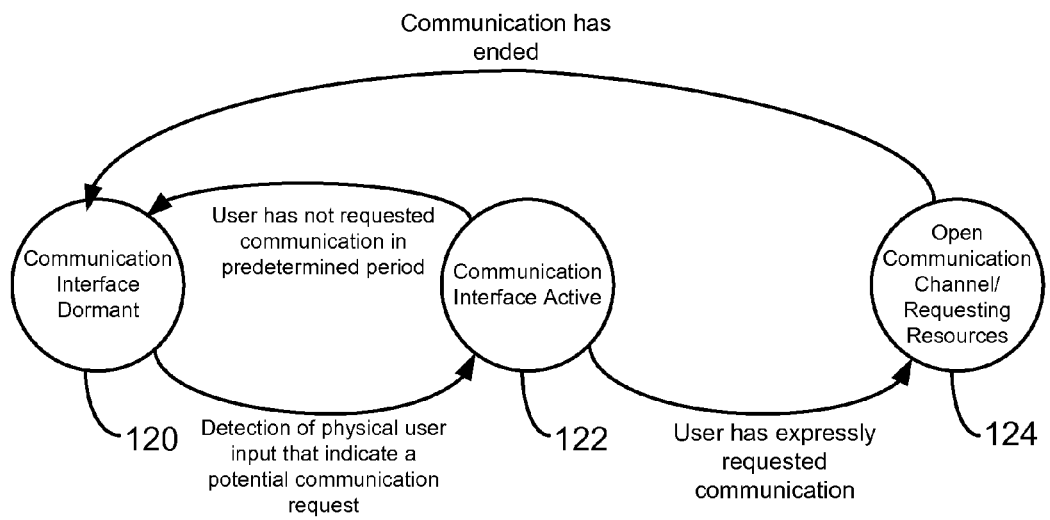
FIG. 4A illustrates a state diagram for the wireless communication device and the communication interface according to an embodiment of the invention.
Figure 5:
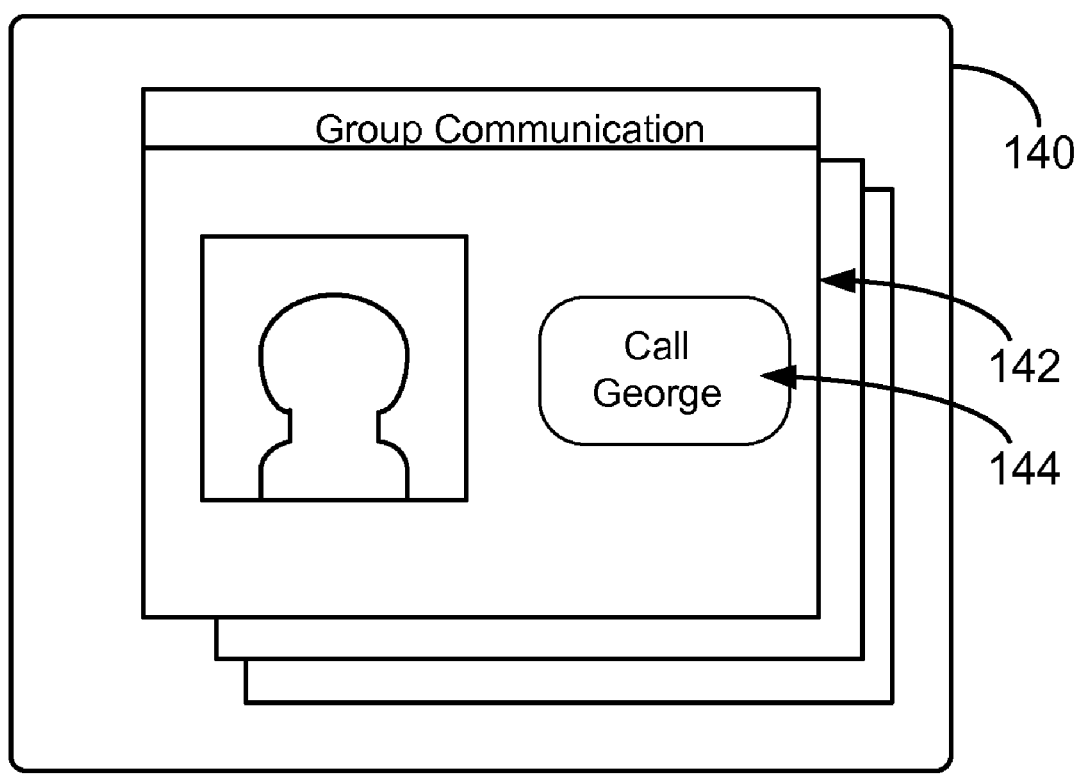
FIG. 5 illustrates a display of a GUI for a wireless communication device with a plurality of resident applications interfaces (APIs) and the group communication API with a soft key for making a PTT communication according to an embodiment of the invention.

The wireless communication device 74 includes one or more user interfaces with which the user physically interacts with the wireless communication device, such as the PTT button 78, numerical press-button key set 79, or soft key 144, as shown in FIG. 5. The user interaction may include requesting a communication channel from the communication interface 92. In an example, a predetermined physical interaction by the user with a user interface indicative of a forthcoming request for communication, the communication interface 92 will change to an active state without requesting resources from the wireless communication network, such as fully opening a communication channel (e.g., a traffic channel). The wireless communication device 74 can also activate one or more applications 110 in preparation for the opening of a communication channel in addition to the communication interface 92 being changed to an active state. For example, if the user is invoking a resident application for another function that is likely to be used in conjunction with the opening of the communication channel, such as a data compression program, such application can be invoked at the receipt of the physical interactions. The different states (e.g., active state, dormant state and communication state) of the communication interface 92 will be described in more detail below with respect to FIG. 4A.

As embodied here, where at least one user interface is a pressable button 74, the predetermined physical interaction is a button-press. Another UI present on the wireless communication device 74 is a series of pressable numeric keys, and the predetermined physical interaction can also be a set number of key presses, such as dialing the first three numbers of an area code.

FIG. 4A is a state diagram for the wireless communication device 74 and the communication interface 92. The wireless communication device 74 in a first state 120 ("dormant state 120") has the communication interface 92 dormant, and upon detection by the wireless communication device 74 that a physical user interaction (e.g., one or more physical user inputs into a UI of the device 74) has occurred that indicates a potential communication session resource request in the near future (e.g., within a threshold period of time), the wireless communication device 74 changes or transitions the communication interface 92 to the active state, as shown at state 122.

For example, a physical user interaction from which a potential communication session resource request can be inferred within the threshold period of time can be the user expressly requesting the opening of a communication channel. In another example, the physical user interaction (e.g., a predetermined physical interaction) may correspond to a user of the device 74 beginning to press numeric keys indicative of a phone number being dialed, with the device 74 being programmed to anticipate that once the user completes entry of the phone number, the user will request a call to be initiated.

Upon entry into state 122, the wireless communication device 74 loads applications and/or takes other actions, such that the wireless communication device 74 can open a communication channel or request resources upon receipt of request to open the communication channel more quickly than if the device 74 had remained in the dormant state 120. For example, the applications and/or other actions that occur upon entry into the active state may include bringing up the radio bearer (i.e., transitioning the radio bearer of the communication interface 92 from an inactive or dormant to an active state), which involves waking up the communication interface 92 (e.g., a modem antenna) of the device 74. For example, in EV-DO, the device 74 wakes up the radio bearer by executing a 'searcher' program. In an example, the radio bearer can transition from a dormant or inactive state to an active state in approximately 20 milliseconds (ms).

In active state 122, if the user does not request to initiate a communication session (e.g., the user does not trigger a communication session resource request) after the elapse of a predetermined period of time, the wireless communication device 74 will transition the communication interface 92 back to dormant state 120. Otherwise, if the user requests to initiate a communication session (e.g., by pressing a 'Send' or 'Connect' button after designating a party or parties to be called, etc.), or originally requested initiation of a communication session, then the wireless communication device 74 transitions to communication state 124 and opens the communication channel and/or sends a request for resources (e.g., Quality of Service (QoS) resources) to facilitate the communication session. It will be appreciated that, alternatively, the communication interface 92 may advance from dormant state 120 directly to communication state 124 if the detection of physical user interaction indicative of a potential communication session resource request is concurrent with the detection of an actual communication session resource request or communication session initiation instruction from the user.

In communication state 124, once the communication channel is closed (e.g., after a call is dropped, after a user pressed an 'End' button on the wireless communication device 74, etc.), the wireless communication device 74 will transition the communication interface 92 back to the dormant state 120. It should be noted that firmware or software can be configured to control the state transitions of the communication interface 92 between dormant state 120, active state 122 and communication state 124.

As will be appreciated by one of ordinary skill in the art, conventionally, the device 74 would wake up the radio bearer of the communication interface 92 either periodically (e.g., to check a downlink paging or control channel for potential or actual pages of the device 74), or when the user of device 74 indicates an express request to open a communication channel and send data to an access network. However, as shown in FIG. 4A, in an embodiment of the invention the device 74 first enters the active state 122 and wakes up the communication interface 92 before the express request by the user. This means that the device 74 need not wait for the radio bearer to be established when an actual user command to open a communication channel and send data occurs upon entry into the communication state 124. In an example, as noted above, the radio bearer of the communication interface 92 takes approximately 20 milliseconds (ms) to bring up from an inactive to an active state. Thus, per data transmission, having the bearer channel pre-established when a user command to send data is received saves 20 ms per data transmission (e.g., except when the user command overlaps with the periodic wake-up to check for downlink data). This assumes, of course, that the device 74 begins in the dormant state 120 and is not already engaged in communication sessions where its radio bearer is already active.

Further, it will be appreciated that if the user requests to initiate a communication session while in active state 122 and the process for bringing up the radio bearer has not yet completed, the active state 122 still changes to the communication state 124 and the device 124 continues to wake up the radio bearer for the communication session. Thus, the time savings before data can be sent from the device 74 in this case corresponds to the amount of time the device 74 was in the active state 122 before the transition to the communication state 124, which may be within the range of 0 to 20 ms, assuming 20 ms corresponds to the total time for waking up the radio bearer.

An illustrative example of the state transitions of FIG. 4A during communication session setup will now be described with respect to FIG. 4B. Accordingly, FIG. 4B illustrates a communication session setup process based on the state transitions of FIG. 4A according to an embodiment of the invention.

Figure 4B:
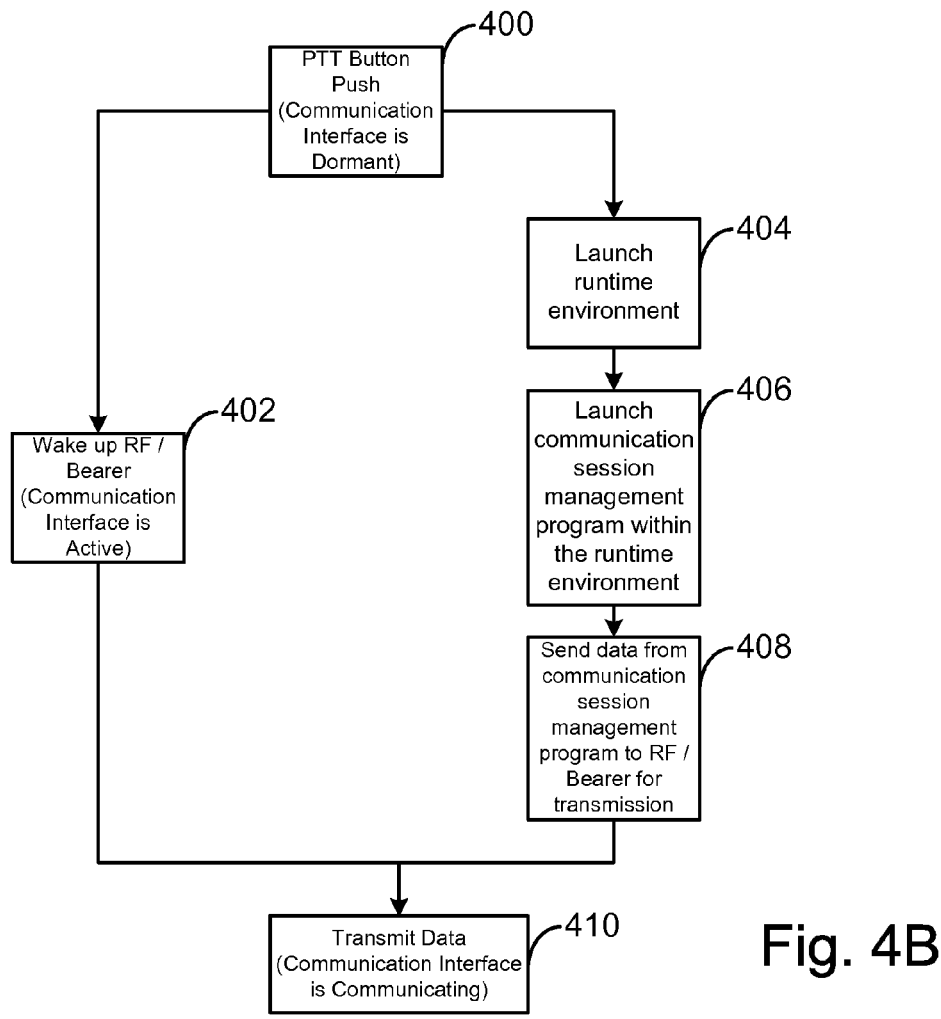
FIG. 4B illustrates a communication session setup process based on the state transitions of FIG. 4A according to an embodiment of the invention.

Referring to FIG. 4B, assume that the communication interface 92 is in dormant state 120 when a user of the device 74 pushes a PTT button to initiate a PTT communication session, 400. Accordingly, the process of FIG. 4B advances to blocks 402 and 404 in parallel. In 402, the device 74 wakes up the radio bearer and the communication interface 92 thereby transitions from the dormant state 120 to the active state 122. In 404, the device 74 launches a runtime environment (e.g., BREW, as discussed above). After launching the runtime environment in 404, the device 404 further launches a communication session management program (e.g., a QChat client for handling group communication sessions) within the runtime environment. Next, the communication session management program prepares data for transmission to an access network on a reverse link (e.g., a request for resources to support the communication session), and sends the prepared data to the radio bearer for transmission, 408. At this point, the communication interface 92 transitions from the active state 122 (i.e., a state wherein the interface 92 is ready to send data but is not actually sending data) to communication state 124, and transmits the data, 410. As will be appreciated by one of ordinary skill in the art, because the radio bearer is already awake due to block 402, an additional delay associated with waking up the radio bearer after the data preparation block 408 can be reduced and/or avoided.

FIG. 5 is a representative illustration of one embodiment of a display 140 of a wireless communication device 74 with a plurality of resident applications on the primary display. The interfaces shown here are in a "windowed" arrangement, a common graphic interface in user interfaces. The UI control methodology described herein is equally applicable to other UI systems and display schemas, control interfaces for the user to access the computer platform 82. Here, there is a UI specifically for group communications 142, and a pressable soft key 144 is on the UI. Thus, in an example, the detection of one or more physical user interactions indicative of a potential communication session resource request within the threshold period of time, to cause or trigger the communication interface 92 to be transitioned into an active state 122 from dormant state 120 in FIG. 4A, may correspond to a predetermined physical interaction such as pressing the soft key 144. In an alternative example, the detection of the one or more physical user interactions may correspond to a user re-arranging the visual interface of the display 140 to bring group communication UI 142 to the top of the arrangement, from which the device 74 can infer the possibility that the user will then indicate a selection of the group communication UI 142 so as to initiate a group communication. In other words, if the user of the device 74 takes the time to place the group communication UI 142 at the forefront of the window display, the user may be likely to further select, via the group communication UI 142, a request to initiate a group communication session in within a threshold period of time (e.g., within two seconds, five seconds, etc.).

Figure 6:
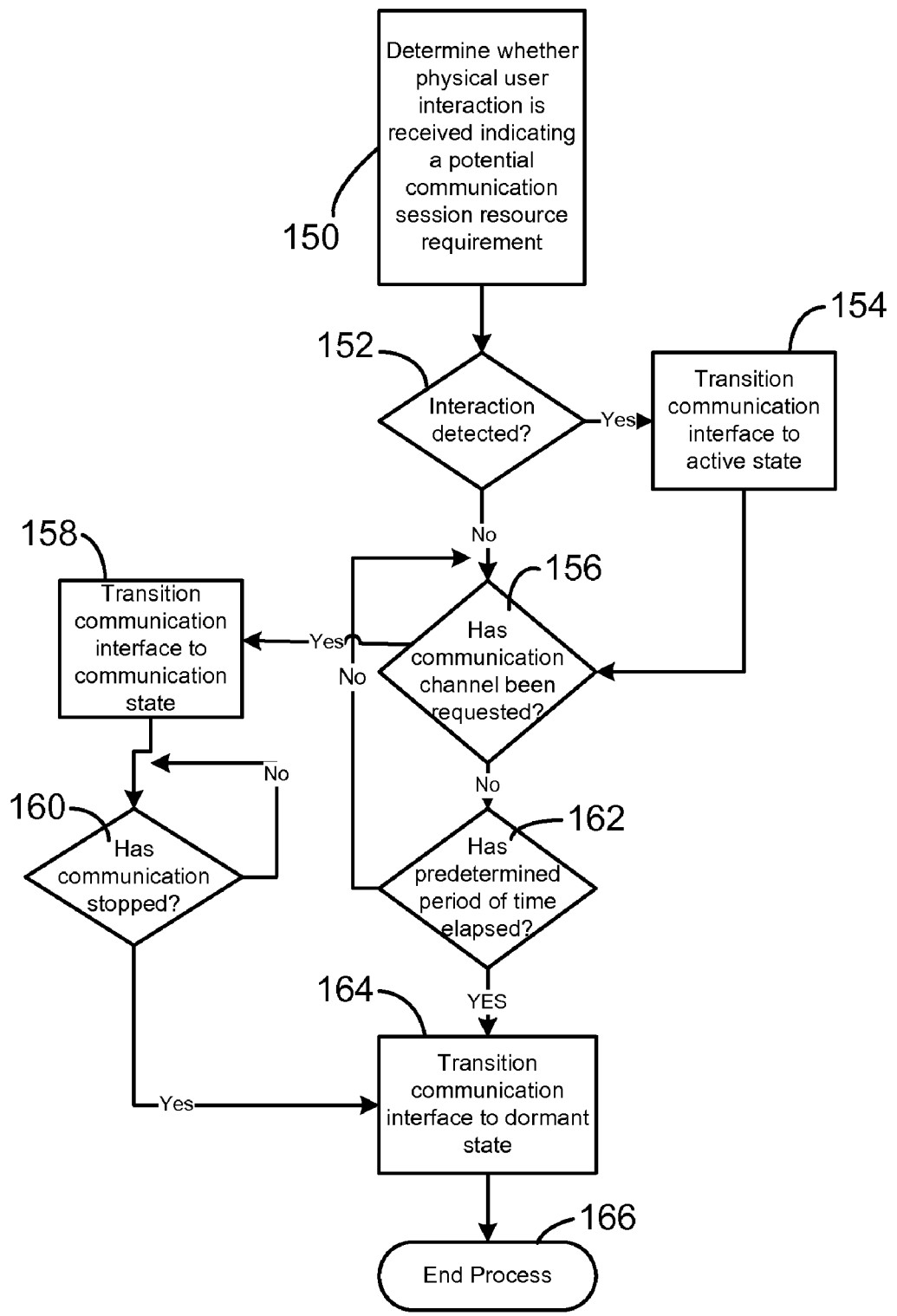
FIG. 6 illustrates a process for transitioning a communication interface of the wireless communication device to an active state upon a detection of physical user interaction indicative of a potential near-future communication session resource request according to an embodiment of the invention.

FIG. 6 is a flowchart of one embodiment of a process for transitioning the communication interface 92 to an active state 122 upon detection of physical user interaction indicating a potential communication session resource request within a threshold period of time. For example, the detection may correspond to the user of the device 74 making a predetermined physical interaction with a UI of the wireless communication device 74.

Referring to FIG. 6, the wireless communication device 74 determines whether a physical user interaction has been detected that indicates a potential communication session resource request (e.g., a request for a traffic channel, QoS resources, etc.), on the part of the user of the device 74, is likely to occur within a threshold period of time (e.g., 200 ms, 2 seconds, 5 seconds, etc.). For example, the physical user interactions checked for by the wireless communication device 74 may correspond a predetermined or preset listing of physical user inputs known to be associated (e.g., from an empirical study, from a history of a particular user's interaction with the device 74, etc.) with likely communication session resource requests within the given time frame, or threshold time.

In 152, if one or more of the predetermined physical user interactions are detected based on the determination of 150, then the communication interface 92 is transitioned to an active state 122 as shown at step 154, and then a determination is made as to whether a communication channel has been requested (e.g., when the potential communication session is actually requested to be initiated by the user), as shown at decision 156. As noted above with respect to FIG. 4A, upon transitioning to the active state 122 from the dormant state 120 may correspond to a preemptive wakeup of the radio bearer, or antenna, of the device 74 before a user explicitly requests data to be transmitted to an access network by requesting a communication channel. Otherwise, if the one or more predetermined physical user interaction are not detected at decision 152, then a determination is likewise made at decision 156 as to whether one or more communication session resources (e.g., a communication or traffic channel, a given amount of Quality of Service (QoS) resources, etc.) have been requested by the user.

If communication session resources have not been requested at decision 156, a determination is then made as to whether a predetermined period of time has elapsed, as shown at decision 162. Otherwise, if communication session resources have been requested by the user of the device 74 at decision 156, then the communication interface 92 transitions to the communication state 124, and communication session resources are requested and/or opened, 158 (e.g., a communication channel is opened, QoS resources are requested, etc). As will be appreciated by one of ordinary skill in the art, the communication state 124 can be transitioned to in 158 either from the active state 122 (e.g., if the physical user interaction indicative of a potential communication session resource request is detected in 150/152), or from the dormant state 120 (e.g., if the physical user interaction indicative of a potential communication session resource request is not detected in 150/152).

After transitioning to the communication state 124, the user of the wireless communication device 74 engages in the communication session after the communication session resources are allocated (e.g., the user listens to a multicast session while a floor-holder is speaking, the user him/herself is the active floor-holder for the multicast session, the user participates in a non-multicast direct call to one other call participant, the user participates in a non-call data transport session, etc.). Also, after transitioning the communication interface 92 to the communication state 124, the wireless communication device 74 determines, 160, when the communication session has ended. When the wireless communication device 74 determines that the communication session is over (e.g., the call has dropped, the user has pressed an 'End' button to cancel the call or data transport session, etc.), the process advances to 164.

Returning to 156, if the communication resources have not been requested or opened at decision 156, then a decision is made as to whether a predetermined period of time has elapsed (e.g. 5 seconds) since the communication interface 92 transitioned to active state 122. As will be appreciated, this grants the user of the device 74 a brief period to consider whether to initiate a communication session after the physical user interaction is detected in 150 and 152. If the predetermined period of time has not elapsed at decision 162, then the process returns to determine if communication session resources (e.g., a communication channel, QoS resources, etc.) have been requested at decision 156. Otherwise, if the predetermined period has elapsed at decision 162, or once the communication session is determined to have stopped at decision 160, the communication interface 92 transitions back to the dormant state 120, as shown at step 164, and the process terminates, as shown at termination 166.

Accordingly, in an embodiment of the invention, the wireless communication device 74 includes one or more user interfaces (e.g., such as PTT button 78 or key set 79) with which the user physically interacts with the wireless communication device 74, such interaction to include requesting a communication channel (or other communication session resources) from a communication interface 92 of the wireless communication device 74, including the steps of receiving a predetermined physical interaction by the user at a user interface indicative of a forthcoming request for communication, and changing the communication interface 92 to an active state (such as state 122 in FIG. 4A), the communication interface 92 having at least a dormant state 120, active state 122 and communication state, wherein communication session resources are prepared to be requested from a wireless communication network in the active state, whereas the communication session resources are only actually requested from the wireless communication network in the communication state. Accordingly, a potential, near-future communication session resource request can be inferred from a given physical user interface input.

Embodiments can further include, during the 'active' state 122 for the communication interface, activating one or more applications 110 (e.g., a searcher program to wake-up the radio bearer) in preparation for the opening of a communication channel from the communication interface 92 in addition to the communication interface 92 being changed to an active state. If the wireless communication device 74 includes a user interface with a pressable button, such as PTT button 78, then receiving a predetermined physical interaction may correspond to receiving a button-press of the PTT button 78 in at least one example. If the mobile telephone 74 includes a user interface having a plurality of numeric keys (e.g., key set 79), then the predetermined physical interaction may correspond to receiving a given number of key presses of the numeric keys (e.g., in a given sequence that is consistent with a phone number in a contact list maintained by the mobile telephone 74, etc.). If the user interface is embodied as in FIG. 5, with a pressable soft key 144 on a graphic user interface 142 of the wireless communication device 74, receiving the predetermined physical interaction may correspond to pressing the soft key 144.

The transition of the communication interface 92 to an active state based upon the detected physical user interaction(s) indicative of a potential communication session resource request can be controlled by firmware or software applications of the wireless communication device 74. Likewise, in the active state 122, upon detection of an actual indication that the user wishes to initiate the communication session, the firmware of software applications of the wireless communication device 74 can transition the communication interface 92 to the communication state and request an open communication channel, or other communication session resources such as QoS resources. The firmware of software applications of the wireless communication device 74 can also be configured to transition or change the communication interface 92 back to a dormant state 120 from the active state 122 after the elapse of a predetermined period without the user requesting to initiate the communicate session, as shown in FIG. 6.

In view of the methods being executable on a mobile device computer platform, the method can accordingly be performed by a program resident in a computer readable medium, where the program directs the mobile device or other computer device having a computer platform to perform the steps of the method. The computer readable medium can be the memory of the device, a server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While embodiments of the invention has been particularly shown and described with reference to particular types of hardware, software telecommunication protocols, etc., it will be understood by those skilled in the art that various changes in form and detail may be made without departing from the scope of the present invention as set forth in the following claims.

What is claimed is:

1. A method for allocating communication session resources at a wireless communication device having a user thereof, comprising:

determining whether one or more physical user interactions are present, at the wireless communication device, that indicate a potential communication session resource request within a threshold period of time, a communication interface of the wireless communication device being in a dormant state characterized by the wireless communication device not being permitted to engage in a communication session with a wireless communication network; and transitioning, based on the determining step, the communication interface of the wireless communication device from the dormant state to an active state, the active state characterized by the wireless communication device not being permitted to transmit a communication session resource request to the wireless communication network to obtain one or more communication session resources; and performing, while the communication interface of the wireless communication device is in the active state, one or more actions to reduce a delay associated with a transmission of the potential communication session resource request in the event that the potential communication session resource request is actually transmitted by the wireless communication device.

2. The method of claim 1, wherein the communication interface corresponds to a radio bearer, and the one or more actions performed in the performing step correspond to waking up the radio bearer in the active state before the user issues an explicit request to transmit the communication session resource.

3. The method of claim 1, further comprising:
receiving a request from the user that requires the one or more communication session resources;
transitioning the communication interface of the wireless communication device from the active state to a communication state, the communication state characterized by the wireless communication device being permitted to transmit the communication session resource request to the wireless communication network to obtain the one or more communication session resources; and
transmitting, while the communication interface of the wireless communication device is in the communication state, one or more communication session resource requests for requesting the one or more communication session resources.

4. The method of claim 3, wherein the received request corresponds to a request from the user to initiate the communication session with the wireless communication network.

5. The method of claim 3, further comprising:
receiving, from the wireless communication network, an allocation of the requested one or more communication session resources; and
exchanging one or more data packets between the wireless communication device and the wireless communication network during the communication session using the allocated one or more communication session resources.

6. The method of claim 3, further comprising:
determining that the communication session is over; and
transitioning the communication interface of the wireless communication device from the communication state to the dormant state after the communication session is determined to be over.

7. The method of claim 6, wherein the communication session is determined to be over based on a period of inactivity during the communication session, a request by the user to terminate the communication session or an indication from the wireless communication network that the communication session is terminated.

8. The method of claim 1, wherein the one or more physical user interactions include at least one of (i) the user pressing a predetermined physical button on a keypad of the wireless communication device, (ii) the user pressing a predetermined software button on a display of the wireless communication device, (iii) the user entering one or more digits of a phone number into the keypad of the wireless communication device, (iv) the user re-arranging windows in the display of the wireless communication device such that a window known to be associated with the communication session resource requests is more prominently displayed on the display.

9. The method of claim 1, wherein the potential communication session resource request corresponds to a potential request for a traffic channel or a potential request for a given level of Quality of Service (QoS).

10. The method of claim 1, wherein the one or more actions performed while the communication interface of the wireless communication device is in the active state includes activating one or more applications resident at a computer platform on the wireless communication device in order to prepare for the potential communication session resource request.

11. The method of claim 10, wherein the one or more applications include a searcher program that wakes up a radio bearer of the wireless communication device.

12. The method of claim 1, further comprising:
transitioning the communication interface of the wireless communication device from the active state to the dormant state without transitioning to a communication state if the user does not request the potential communication session resource request within the threshold period of time.

13. A wireless communication device comprising:
means for determining whether one or more physical user interactions are present, at the wireless communication device, that indicate a potential communication session resource request within a threshold period of time, a communication interface of the wireless communication device being in a dormant state characterized by the wireless communication device not being permitted to engage in a communication session with a wireless communication network; and
means for transitioning, based on the determination of the means for determining, the communication interface of the wireless communication device from the dormant state to an active state, the active state characterized by the wireless communication device not being permitted to transmit a communication session resource request to the wireless communication network to obtain one or more communication session resources; and
means for performing, while the communication interface of the wireless communication device is in the active state, one or more actions to reduce a delay associated with a transmission of the potential communication session resource request in the event that the potential communication session resource request is actually transmitted by the wireless communication device.

14. The wireless communication device of claim 13, wherein the communication interface corresponds to a radio bearer, and the one or more actions performed by the means for performing correspond to waking up the radio bearer in the active state before the user issues an explicit request to transmit the communication session resource.

15. The wireless communication device of claim 13, further comprising:
means for receiving a request from the user that requires the one or more communication session resources;
means for transitioning the communication interface of the wireless communication device from the active state to a communication state, the communication state characterized by the wireless communication device being permitted to transmit the communication session resource request to the wireless communication network to obtain the one or more communication session resources; and means for transmitting, while the communication interface of the wireless communication device is in the communication state, one or more communication session resource requests for requesting the one or more communication session resources.

16. The wireless communication device of claim 15, wherein the received request corresponds to a request from the user to initiate the communication session with the wireless communication network.

17. The wireless communication device of claim 15, further comprising:

means for receiving, from the wireless communication network, an allocation of the requested one or more communication session resources; and means for exchanging one or more data packets between the wireless communication device and the wireless communication network during the communication session using the allocated one or more communication session resources.

18. The wireless communication device of claim 15, further comprising:

means for determining that the communication session is over; and means for transitioning the communication interface of the wireless communication device from the communication state to the dormant state after the communication session is determined to be over.

19. The wireless communication device of claim 13, wherein the one or more physical user interactions include at least one of (i) the user pressing a predetermined physical button on a keypad of the wireless communication device, (ii) the user pressing a predetermined software button on a display of the wireless communication device, (iii) the user entering one or more digits of a phone number into the keypad of the wireless communication device, (iv) the user re-arranging windows in the display of the wireless communication device such that a window known to be associated with communication session resource requests is more prominently displayed on the display.

20. The wireless communication device of claim 13, wherein the one or more actions performed while the communication interface of the wireless communication device is in the active state includes activating one or more applications resident at a computer platform on the wireless communication device in order to prepare for the potential communication session resource request.

21. The wireless communication device of claim 20, wherein the one or more applications include a searcher program that wakes up a radio bearer of the wireless communication device.

22. A wireless communication device having a user thereof, comprising:

logic configured to determine whether one or more physical user interactions are present, at the wireless communication device, that indicate a potential communication session resource request within a threshold period of time, a communication interface of the wireless communication device being in a dormant state characterized by the wireless communication device not being permitted to engage in a communication session with a wireless communication network; and logic configured to transition, based on the determination of the logic configured to determine, the communication interface of the wireless communication device from the dormant state to an active state, the active state characterized by the wireless communication device not being permitted to transmit a communication session resource request to the wireless communication network to obtain one or more communication session resources; and logic configured to perform, while the communication interface of the wireless communication device is in the active state, one or more actions to reduce a delay associated with a transmission of the potential communication session resource request in the event that the potential communication session resource request is actually transmitted by the wireless communication device.

23. The wireless communication device of claim 22, wherein the communication interface corresponds to a radio bearer, and the one or more actions performed by the logic configured to perform correspond to waking up the radio bearer in the active state before the user issues an explicit request to transmit the communication session resource.

24. The wireless communication device of claim 22, further comprising:

logic configured to receive a request from the user that requires one or more communication session resources;

logic configured to transition the communication interface of the wireless communication device from the active state to a communication state, the communication state characterized by the wireless communication device being permitted to transmit the communication session resource request to the wireless communication network to obtain the one or more communication session resources; and logic configured to transmit, while the communication interface of the wireless communication device is in the communication state, one or more communication session resource requests for requesting the one or more communication session resources.

25. The wireless communication device of claim 24, wherein the received request corresponds to a request from the user to initiate the communication session with the wireless communication network.

26. The wireless communication device of claim 24, further comprising:

logic configured to receive, from the wireless communication network, an allocation of the requested one or more communication session resources; and logic configured to exchange one or more data packets between the wireless communication device and the wireless communication network during the communication session using the allocated one or more communication session resources.

27. The wireless communication device of claim 24, further comprising:

logic configured to determine that the communication session is over; and logic configured to transition the communication interface of the wireless communication device from the communication state to the dormant state after the communication session is determined to be over.

28. The wireless communication device of claim 22, wherein the one or more physical user interactions include at least one of (i) the user pressing a predetermined physical button on a keypad of the wireless communication device, (ii) the user pressing a predetermined software button on a display of the wireless communication device, (iii) the user entering one or more digits of a phone number into the keypad of the wireless communication device, (iv) the user re-arranging windows in the display of the wireless communication device such that a window known to be associated with communication session resource requests is more prominently displayed on the display.

29. The wireless communication device of claim 22, wherein the one or more actions performed while the communication interface of the wireless communication device is in the active state includes activating one or more applications resident at a computer platform on the wireless communication device in order to prepare for the potential communication session resource request.

30. The wireless communication device of claim 29, wherein the one or more applications include a searcher program that wakes up a radio bearer of the wireless communication device.

31. A non-transitory computer-readable storage medium comprising instructions, which, when executed by a wireless communication device having a user thereof, cause the wireless communication device to perform operations, the instructions comprising:
    program code to determine whether one or more physical user interactions are present, at the wireless communication device, that indicate a potential communication session resource request within a threshold period of time, a communication interface of the wireless communication device being in a dormant state characterized by the wireless communication device not being permitted to engage in a communication session with a wireless communication network; and
    program code to transition, based on the determination of the program code to determine, the communication interface of the wireless communication device from the dormant state to an active state, the active state characterized by the wireless communication device not being permitted to transmit a communication session resource request to the wireless communication network to obtain one or more communication session resources; and
    program code to perform, while the communication interface of the wireless communication device is in the active state, one or more actions to reduce a delay associated with a transmission of the potential communication session resource request in the event that the potential communication session resource request is actually transmitted by the wireless communication device.

32. The non-transitory computer-readable storage medium of claim 31, wherein the communication interface corresponds to a radio bearer, and the one or more actions performed by the program code to perform correspond to waking up the radio bearer in the active state before the user issues an explicit request to transmit the communication session resource.

33. The non-transitory computer-readable storage medium of claim 31, further comprising:
    program code to receive a request from the user that requires the one or more communication session resources;
    program code to transition the communication interface of the wireless communication device from the active state to a communication state, the communication state characterized by the wireless communication device being permitted to transmit the communication session resource request to the wireless communication network to obtain the one or more communication session resources; and
    program code to transmit, while the communication interface of the wireless communication device is in the communication state, one or more communication session resource requests for requesting the one or more communication session resources.

34. The non-transitory computer-readable storage medium of claim 33, wherein the received request corresponds to a request from the user to initiate a communication session with the wireless communication network.

35. The non-transitory computer-readable storage medium of claim 33, further comprising:
    program code to receive, from the wireless communication network, an allocation of the requested one or more communication session resources; and
    program code to exchange one or more data packets between the wireless communication device and the wireless communication network during the communication session using the allocated one or more communication session resources.

36. The non-transitory computer-readable storage medium of claim 33, further comprising:
    program code to determine that the communication session is over; and
    program code to transition the communication interface of the wireless communication device from the communication state to the dormant state after the communication session is determined to be over.

37. The non-transitory computer-readable storage medium of claim 31, wherein the one or more physical user interactions include at least one of (i) the user pressing a predetermined physical button on a keypad of the wireless communication device, (ii) the user pressing a predetermined software button on a display of the wireless communication device, (iii) the user entering one or more digits of a phone number into the keypad of the wireless communication device, (iv) the user re-arranging windows in the display of the wireless communication device such that a window known to be associated with communication session resource requests is more prominently displayed on the display.

38. The non-transitory computer-readable storage medium of claim 31, wherein the one or more actions performed while the communication interface of the wireless communication device is in the active state includes activating one or more applications resident at a computer platform on the wireless communication device in order to prepare for the potential communication session resource request.

39. The non-transitory computer-readable storage medium of claim 38, wherein the one or more applications include a searcher program that wakes up a radio bearer of the wireless communication device.

* * * * *